US012575912B2

(12) United States Patent
Roshkovan

(10) Patent No.: US 12,575,912 B2
(45) Date of Patent: Mar. 17, 2026

(54) DENTAL IMPLANT ATTACHMENT SYSTEM IN SCREW-RETAINED CONFIGURATION FOR IMPLANT-SUPPORTED AND IMPLANT-RETAINED REMOVABLE DENTURES AND METHOD OF USE

(71) Applicant: Igor Roshkovan, Los Angeles, CA (US)

(72) Inventor: Igor Roshkovan, Los Angeles, CA (US)

( * ) Notice: Subject to any disclaimer, the term of this patent is extended or adjusted under 35 U.S.C. 154(b) by 48 days.

(21) Appl. No.: 17/803,395

(22) Filed: Jun. 23, 2022

(65) Prior Publication Data

US 2023/0414329 A1 Dec. 28, 2023

(51) Int. Cl.
*A61C 8/00* (2006.01)
*A61C 13/265* (2006.01)

(52) U.S. Cl.
CPC ............ *A61C 8/00* (2013.01); *A61C 13/2656* (2013.01)

(58) Field of Classification Search
CPC .............................. A61C 8/00; A61C 13/2656
See application file for complete search history.

(56) References Cited

U.S. PATENT DOCUMENTS

| | | |
|---|---|---|
| 4,359,318 A | 11/1982 | Gittleman |
| 4,431,416 A | 2/1984 | Niznick |
| 4,488,874 A | 12/1984 | Soifer |

| | | |
|---|---|---|
| 4,488,875 A | 12/1984 | Niznick |
| 4,540,367 A | 9/1985 | Sulc |
| 4,626,213 A | 12/1986 | Shiner et al. |
| 4,854,872 A | 8/1989 | Detsch |
| 4,907,969 A | 3/1990 | Ward |
| 4,988,297 A | 1/1991 | Lazzara et al. |
| 5,092,770 A | 3/1992 | Zakula |
| 5,120,222 A | 6/1992 | Sulc |
| 5,194,000 A | 3/1993 | Dury |
| 5,195,891 A | 3/1993 | Sulc |
| 5,211,561 A * | 5/1993 | Graub ................ A61C 13/2653 |
| | | 433/172 |
| 5,238,405 A * | 8/1993 | Marlin ................. A61C 8/0069 |
| | | 433/172 |
| 5,417,570 A | 5/1995 | Zuest et al. |

(Continued)

FOREIGN PATENT DOCUMENTS

| | | |
|---|---|---|
| CH | 597843 | 4/1978 |
| CH | 651462 A5 | 9/1985 |

*Primary Examiner* — Eric J Rosen
*Assistant Examiner* — Hao D Mai

(57) ABSTRACT

A dental implant attachment system for implant-supported and implant-retained type removable dentures and a method of use is described. The dental attachment system is made up of a female component embedded in the body of a denture on a fitting surface for lock up and a male component usually connected to a dental implant and a locking mechanism of the snap on coupling engageable formation movement with non-static friction by pressing female component onto the male component. The male and female components have a semi-elliptical parabolic or dome shape with a tunnel shape or inverted U shape lockers and antirotating thorns. The novel use of geometrical shapes for the mating surfaces of dental attachment system components prevents distortion and improves the mating movement with non-static friction.

18 Claims, 13 Drawing Sheets

(56)                References Cited

U.S. PATENT DOCUMENTS

| | | | | |
|---|---|---|---|---|
| 5,520,540 | A  * | 5/1996 | Nardi | A61C 13/2656 433/172 |
| 5,556,280 | A | 9/1996 | Pelak | |
| 5,667,384 | A  * | 9/1997 | Sutter | A61C 8/0048 433/172 |
| 5,678,997 | A | 10/1997 | De Buck | |
| 5,733,124 | A  * | 3/1998 | Kwan | A61C 8/0024 433/173 |
| 5,842,864 | A  * | 12/1998 | Unger | A61C 8/0048 433/172 |
| 6,030,219 | A  * | 2/2000 | Zuest | A61C 13/2656 433/172 |
| 6,299,447 | B1 * | 10/2001 | Zuest | A61C 8/005 433/172 |
| 6,663,388 | B1 * | 12/2003 | Schar | A61C 8/0069 433/173 |
| 6,726,480 | B1 * | 4/2004 | Sutter | A61C 8/0066 433/173 |
| 7,431,589 | B2 * | 10/2008 | Weissman | A61C 13/225 433/174 |
| 7,785,108 | B2 | 8/2010 | Tache et al. | |
| 8,043,089 | B2 * | 10/2011 | Bulard | A61C 8/005 433/173 |
| 9,314,318 | B2 * | 4/2016 | Mullaly | A61C 8/0066 |
| 9,456,881 | B1 * | 10/2016 | Niznick | A61C 8/0053 |
| 11,284,971 | B2 * | 3/2022 | Wood | A61C 8/0095 |
| 11,510,762 | B2 * | 11/2022 | Glueck | A61C 13/2656 |
| 2003/0224328 | A1 * | 12/2003 | Sapian | A61C 8/0086 433/173 |
| 2004/0018471 | A1 * | 1/2004 | Giorno | A61C 8/0089 433/221 |
| 2005/0202371 | A1 * | 9/2005 | McGuire | A61F 2/30771 623/20.15 |
| 2007/0037123 | A1 * | 2/2007 | Mansueto | A61C 8/0022 433/173 |
| 2008/0057476 | A1 * | 3/2008 | Zettler | A61C 8/0066 433/173 |
| 2008/0153063 | A1 * | 6/2008 | Mullaly | A61C 13/2656 433/174 |
| 2008/0171307 | A1 * | 7/2008 | Wilcox | A61C 8/0048 433/222.1 |
| 2008/0182227 | A1 * | 7/2008 | Wolf | A61C 8/0066 433/174 |
| 2008/0254411 | A1 * | 10/2008 | Bondar | A61C 8/0001 433/174 |
| 2009/0111072 | A1 * | 4/2009 | Lombardo | A61C 8/0069 433/174 |
| 2009/0197218 | A1 * | 8/2009 | Wiener | A61C 8/0051 433/173 |
| 2009/0325125 | A1 * | 12/2009 | DiAngelo | A61C 8/0048 433/199.1 |
| 2010/0151423 | A1 * | 6/2010 | Ranck | A61C 13/0001 433/193 |
| 2010/0209877 | A1 * | 8/2010 | Hogan | A61C 8/0001 433/214 |
| 2010/0304337 | A1 * | 12/2010 | Zipprich | A61C 8/0053 433/201.1 |
| 2011/0244425 | A1 * | 10/2011 | Wiener | A61C 8/008 433/173 |
| 2012/0214130 | A1 * | 8/2012 | Krivoruk | A61C 8/0089 433/173 |
| 2012/0288827 | A1 * | 11/2012 | Mcbride | A61C 8/0089 433/174 |
| 2013/0167380 | A1 * | 7/2013 | Balshi | A61C 13/10 29/896.1 |
| 2013/0209960 | A1 * | 8/2013 | Benhamou | A61C 8/0022 433/201.1 |
| 2013/0309632 | A1 * | 11/2013 | Sanders | A61C 8/0053 433/173 |
| 2014/0205969 | A1 * | 7/2014 | Marlin | A61C 8/0012 433/196 |
| 2014/0272792 | A1 * | 9/2014 | Haralampopoulos | A61C 8/0075 433/173 |
| 2014/0302457 | A1 * | 10/2014 | Siegmund | A61C 13/20 433/173 |
| 2016/0015483 | A1 * | 1/2016 | Kumar | A61C 13/0003 606/301 |
| 2016/0081776 | A1 * | 3/2016 | Fäh | A61C 8/0093 433/167 |
| 2017/0231728 | A1 * | 8/2017 | Balshi | A61C 13/102 433/171 |
| 2020/0046468 | A1 * | 2/2020 | Pappas | A61C 8/009 |
| 2023/0248479 | A1 * | 8/2023 | Khoury | A61C 8/0048 433/174 |

* cited by examiner

PRIOR ART

House    Implant

DENTAL IMPLANT ATTACHMENT SYSTEM IN SCREW-RETAINED CONFIGURATION FOR IMPLANT-SUPPORTED AND IMPLANT-RETAINED REMOVABLE DENTURES AND METHOD OF USE

BACKGROUND—PRIOR ART

This embodiment is in the field of dental implant attachment assemblies for full and partial removable implant-retained, and implant-supported overdentures and removable dental prostheses, and methods and apparatus for the resilience of implant-supported and implant-retained full and partial removable overdentures and for setting up dental intraoral prostheses in the mouth of patients.

This disclosure concerns improved dental care for full and/or partially edentulous patients, and more to a novel dental implant attachment assemblies for implant-supported and implant-retained full and partial removable overdentures and a method of use.

Edentulous patients with severely resorbed mandible or maxilla jaws frequently experience difficulties with conventional dentures, such as insufficient stability, and retention, together with a reduction in chewing ability.

Dental implant attachment systems for connecting implant-supported and implant-retained full and partial removable overdentures to dental implants used in implant dentistry for over three decades and are generally well known.

This embodiment relates particularly to dental implant attachment assembly and method of use for attaching dental prosthesis such as implant-supported and implant-retained full and partial removable overdentures in edentulous patients and having improved stability, and retention of removable full overdentures, and removable partial overdentures and has reference to the portion of dental device, methods, and apparatus as dental Implant attachment assembly and method of use.

There are numerous present dental implant abutment assemblies for removable implant dentures in the market based on the principle—of the press-button type of connection in which one component of the connection is secured into the dental implant (male part) and the other component is secured into the body removable denture (female part).

In major assemblies, the internal connection between the implant and denture carried out by these two parts have docking, the press-button type of connection or detachable securing the male part, component of implant structure to the female part component of denture structure.

Moreover, the female-abutment component has a socket with a plastic retention insert or retention member and the male-abutment component has a head for a press-button type of connection in the socket.

The following is a tabulation of some prior art that presently appears relevant:

| U.S. Patents | | | |
| --- | --- | --- | --- |
| Pat. No. | Kind Code | Issue Date | Patentee |
| 7,785,108 | B2 | 2010 Aug. 31 | Tache et al. |
| 6,030,219 | A | 2000 Feb. 29 | Zuest et al. |
| 5,556,280 | A | 1996 Sep. 17 | Pelak |

-continued

| | | | |
| --- | --- | --- | --- |
| 4,488,875 | A | 1984 Dec. 18 | Niznick |
| 4,359,318 | A | 1982 Nov. 16 | Gittleman |

| Foreign Patent Documents | | | | |
| --- | --- | --- | --- | --- |
| Foreign Doc. Nr. | Cntry Code | Kind Code | Pub. Dt. | Patentee |
| 651462 | CH | A5 | 1985 Sep. 30 | Hader |
| 597843 | CH | A5 | 1978 Apr. 14 | Hader |

All previous prior arts can be divided into two groups regarding the shape of dental attachment: ball attachments and cylindrical attachments:

The first group can include patents that described the design of dental implant attachment with ball shape of the male part of the attachment system and metal O ring with rubber trim as a female part of the attachment system.

This design of dental implant attachment system is very quick to wear and especially rubbers trim. However, even the ring may wear out over time and need to be repaired, needing routine maintenance visits to reactivate dental implant attachment assembly that is unpleasant and inconvenient for the patient. This process further adds to the cost and complexity of the dental implant attachment assembly.

Moreover, this type of design provided minimal stability for removable dentures and the patient needed constant repairs such as a rubber ring replacement because of distortion of the rubber ring.

Furthermore, the attachment itself quickly wears out as it had the shape of a ball. This design makes the connection between the implant and the removable dental prosthesis ineffective due to the lack of stability and retention base of the physical form of dental implant attachment.

Additionally, as repeated impacts of the metal O shape ring rubber trim and ball attachment may damage the retentive ball as the male component and cause wearing due to abrasion of the components as they move, a squeezable annular ring may be provided to devour the frictional forces and act as a cushion between the male and female part of the dental attachment. These designs have continued to present problems for patients and dental providers.

This group of prior art devices can include the following patents and applications:

| U.S. Patents | | | |
| --- | --- | --- | --- |
| Pat. No. | Kind Code | Issue Date | Patentee |
| 5,678,997 | A | 1997 Oct. 21 | De Buck |
| 5,520,540 | A | 1996 May 28 | Nardi et al. |
| 5,211,561 | A | 1993 May 18 | Graub |
| 5,194,000 | A | 1993 Mar. 16 | Dury |
| 5,092,770 | A | 1992 Mar. 3 | Zakula |
| 4,907,969 | A | 1990 Mar. 13 | Ward |
| 4,626,213 | A | 1986 Dec. 2 | Shiner et al. |
| 4,540,367 | A | 1985 Sep. 10 | Sulc |
| 4,488,874 | A | 1984 Dec. 18 | Soifer |
| 4,431,416 | A | 1984 Feb. 14 | Niznick |

The second group contains patents that described the design of dental implant attachment systems with a cylinder shape for the male part of the attachment and a metal housing with a plastic retention insert for the female part of the attachment.

The cylinder shape attachment with its low-profile design is considered an alternative to the ball attachment.

However, even the plastic retention may wear out over a period and need to be replaced, requiring regular maintenance of the dental implant attachment system that is inconvenient and uncomfortable for the patient and dental practitioner.

Furthermore, to allow the compressible plastic insert must be removed and replaced. Furthermore, foot debris accumulates in the hex-shaped indent or socket of the cylinder and does not make it possible to perform a press-button type of connection and destroys the plastic insert of the male component of attachment.

Moreover, the diameter of the metal housing of dental attachment for some cases appears wider and larger than the size of the body of the dental prosthesis and therefore some parts of the metal housing can also extend beyond the body of the dental prosthesis, can be seen through the body of denture and be uncomfortable from an esthetic point of view for the patient.

In addition, metal housing has a rounded shape and so it is very difficult to stick to a dental prosthesis, and, over time, it becomes loose and created problems for performing press-button type of connection. These designs have continued to present problems.

This group of prior art devices can include the following patents and applications:

| U.S. Patents | | | |
| --- | --- | --- | --- |
| Pat. No. | Kind Code | Issue Date | Patentee |
| 5,417,570 | A | 1995 May 23 | Zuest et al. |
| 5,195,891 | A | 1993 Mar. 23 | Sulc |
| 5,120,222 | A | 1992 Jun. 9 | Sulc |
| 4,988,297 | A | 1991 Jan. 3 | Lazzara et al. |
| 4,854,872 | A | 1989 Aug. 8 | Detsch |

There is the major category of complications that occur in implant dentistry that were related to dental implant attachment systems for implant-supported and implant-retained full and partial removable overdentures is a technical or mechanical complication. Such complications included wear of retention components, fracture of retention components of attachment systems, abutment screw fracture or loosening, activation or changing of the rubber clips, matrix activation such as change of rubber rings, and replacement and change of O-rings housings.

As a result, we need for dental implant attachment system for implant-supported and implant-retained full and partial removable overdentures which effectively has perfect fixation and retention of the prosthesis in the patient mouth without damaging the retentive plastic head insert or wearing out an O ring. There is a need for a dental implant attachment system for implant-supported and implant-retained full and partial removable overdentures which provides strong stability for removable prostheses and greatly minimizes trauma and discomfort to the patient.

BRIEF SUMMARY AND OBJECTS OF THE EMBODIMENT

In reaction to the complications and problems discussed herein, a highly effective novel dental implant attachment system for implant-supported and implant-retained full and partial removable overdentures in a screw-retained configuration that overcomes the disadvantages of the prior art are provided.

Therefore, an item of the present embodiment is to provide a new and improved concept and value-added dental implant attachment system for implant-supported and implant-retained full and partial removable overdentures.

Moreover, it has a self-locating design, which allows the patients to insert and seat the denture easily without the need for precise alignment of the attachment component in a repeatable path of insertion.

An advanced object of the current invention is to provide better retention, stability, and resilience for implant-supported and implant-retained full and partial removable overdentures.

Another feature characteristic of the current inventions is its double retention which provides a greater retention surface area.

According to one characteristic of the present embodiment, a dental implant attachment system for implant-supported and implant-retained full and partial removable overdentures comprises a cap or female component embedded in the body of the denture on a fitting surface for lock up and an attachment abutment component or the stud or male component usually connected to dental implant and use mechanisms such as snap-on engagement or mating movement with friction.

The present embodiment consists of a primary coping as a male portion that is the abutment in a patient's mouth and a secondary sleeve copings as a female component that is attached to the prosthesis and fits on the primary coping.

According to another aspect of the inventions, this embodiment can be qualified as a semi-rigid attachment system that provides adequate retention and stability of implant-supported and implant-retained full and partial removable overdentures and allows some movement control of the denture base.

According to one embodiment of the present disclosure is directed to a dental implant attachment system for implant-supported and implant-retained full and partial removable overdentures, including a semi-elliptical parabolic shape or dome shape dental attachment male and female components, have an upper-end portion defined as a ball shape with arched or tunnel shape lockers as a retention part which has at one end inverted U shape rod protrude toward and can be located on two, three or four outer surfaces of dental attachment male and dental attachment female components.

Moreover, a semi-elliptical parabolic shape of the dental attachment prevents initial deformation of attachment system parts during the setting in place and the withdrawal of dental implant-supported and implant-retained full and partial removable overdenture prosthesis.

The minimalize or absence of resilient deformation of the present dental implant attachment system during transmitting substantial mastication forces to the dental prosthesis makes these innovations a novelty.

In addition, the change geometrical shapes of mating surfaces of dental attachment system such as housing or female component and an attachment abutment or the stud or male component of the current invention, improving mating and snap-on engageable formation movement with non-static friction.

The novelty of the present invention lies in the fact that the new shape of the dental attachment male component does not have a socket for screwing by a screwdriver. The benefit is that the food is not accumulated into the socket and allows the denture to sit well.

According to another embodiment implant attachment housing or female component embedded in the fitting surface of the removable overdenture has the shape-matching element, deepening in the outer surface as the implant attachment in the desired position.

In still another object of the invention, the female component may be pressed onto the male dental attachment component mating and snap engageable formation movement with non-static friction.

After a certain wearing period, the desired friction is decreased, and the precise fit of overdenture is no longer guaranteed. The inverted U shape of retention parts of the current inventions are preventing the excessive wearing of surfaces.

In a preferred embodiment of the invention that the cross-section shapes of the implant attachment and housing components of the attachment system are flower petal shapes.

In addition, the present inventions can be widely used in other medical fields such as auricular, ocular, and nasal reconstructions in plastic and reconstructive surgery.

One novel aspect of the present inventions is that it doesn't contain retention members made from compressible materials or plastic which avoids deformation, nor quickly wear itself out (causing the inability to wear a dental prosthesis by the patients).

According to another aspect of the invention, an attachment assembly is provided predominantly dental attachment housing or female component with the arched or tunnel shape lockers in the outer surface used as an anti-rotation element to prevent circular loose movements in the internal fitting surface of the body of removable denture.

The novel aspect of the present inventions provides better force distribution due to the circumferential relation of the sleeve copings as a female component to the abutment. This function makes an axial transfer of occlusal loads that generate a reduced amount of rotational torque on the dental abutment.

In addition, the novel aspect of the present inventions provides horizontal stabilization as a result of the semi-elliptical parabolic shape or dome shape and stabilizes implant-supported and implant-retained full and partial removable overdentures against lateral dislocation forces.

The current invention could, however, be embodied in several different forms and should not be seen as limited to the embodiments set forth herein rather, these inventions are provided so that this disclosure will be complete, and will fully convey the scope of the invention to those skilled in the art.

The foregoing advantages and objectives of the present embodiment will be more gladly understood upon consideration of the following detailed description of the present invention taken in combination with the selected drawings.

DRAWINGS—REFERENCE NUMERALS

Figure 1:
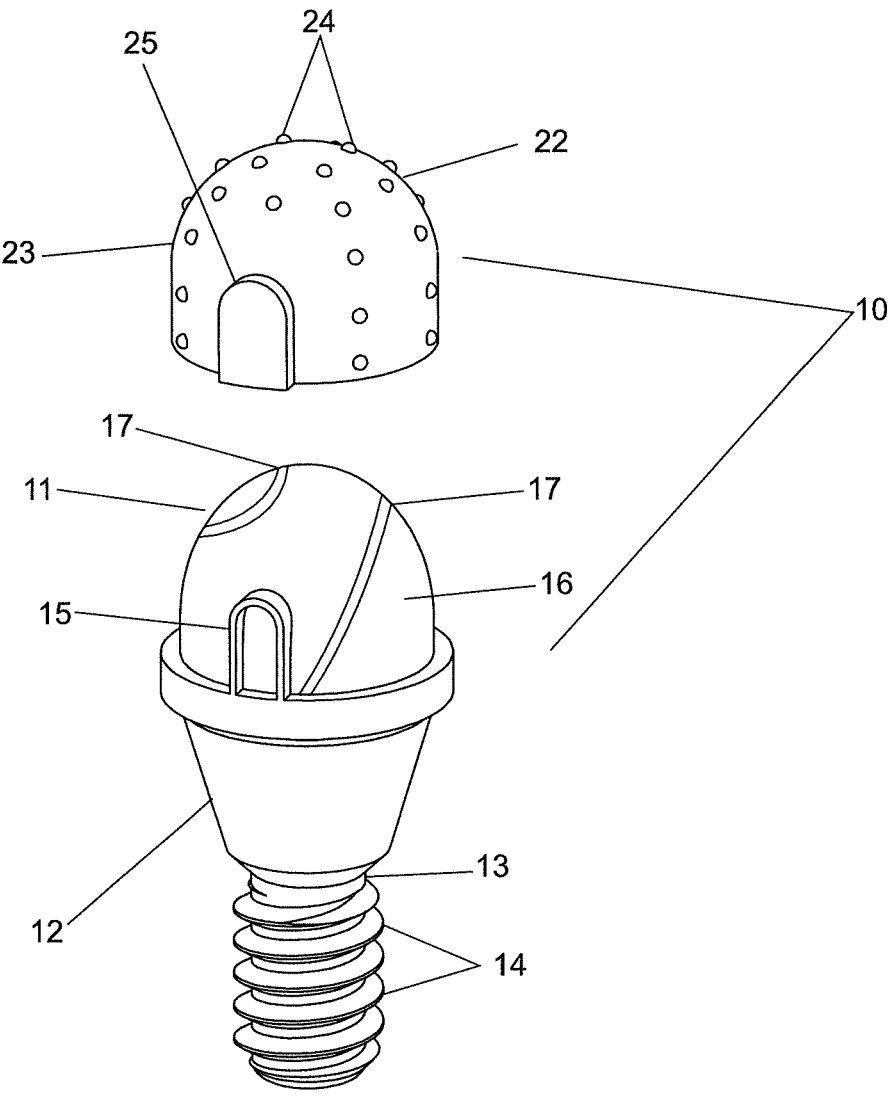
FIG. 1 is a perspective view of a preferred shape of a female and male component shown partially of the dental implant attachment system for dentures with two arched or tunnel shape or inverted U shape lockers for dentures according to another embodiment of the invention, the second arched or tunnel shape locker doesn't show, in screw-retained configuration.
Figure 2:
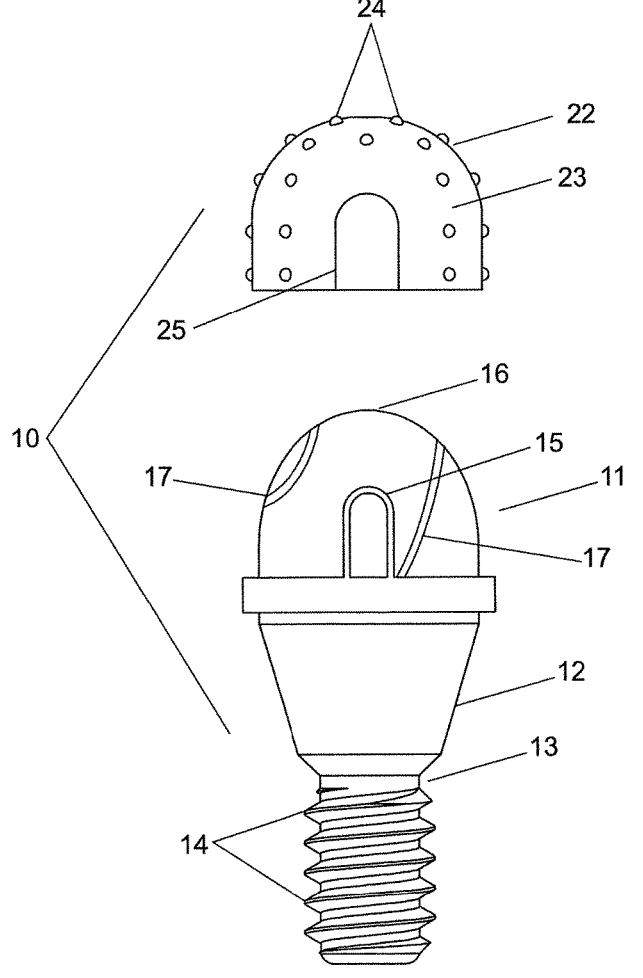
FIG. 2 is a side elevational view of a preferred shape of a female and male component, partially shown, of the dental implant attachment system for dentures, with two arched or tunnel shape or inverted U shape lockers for dentures according to another embodiment of the invention, the second arched or tunnel shape or inverted U shape locker does not show, in screw-retained configuration.

10 Dental implant attachment system for implant-supported or implant-retained removable dentures
11 Male portion of the attachment system
12 Collar of the male portion
13 Threaded core of dental implant attachment
14 Threads
15 Arched or tunnel shape locker, part of the male portion
16 External surface of the male portion
17 Releasing auxiliary hydraulic pressure grooves.
22 Female portion of attachment system or attachment housing
23 External surface of the female portion
24 Antirotating thorns
25 Arched or tunnel shape locker part of the female portion

DETAILED DESCRIPTION OF THE PREFERRED EMBODIMENT

An embodiment of a dental implant attachment system 10 for implant-supported and implant-retained full and partially removable overdentures in the screw-retained configuration of the present invention as shown in FIGS. 1-11.

The dental implant attachment system 10 is made of a comparatively durable material such as stainless steel, titanium, or any other precious alloys.

Referring specifically to FIGS. 1-10, a dental implant attachment system 10 comprises denture attachment as a female portion 22 embedded in the fitting or internal surface of the implant-supported and implant-retained full and partial removable overdentures for lock up and an attachment abutment as male portion 11 usually connected to dental implant and use mating and snap engageable formation movement with non-static friction.

In a preferred embodiment of the current inventions, the female portion of attachment system 22, has preferably an elliptical cone shape or dome shape in nature, and contains antirotating thorns 24, located on the entire external surface 23 of female component 22.

In FIGS. 1-10 antirotating thorns 24 provide stability and prevention of the spinning and rotating movements of the female portion or attachment housing 22 by increasing tightness to the denture (See FIGS. 1-10).

According to another aspect of the current invention, a female portion of the attachment system 22 includes the arched or tunnel shape or inverted U shape lockers 25 as a part of the female portion of the locking mechanism, located in the outer surface of female portion 23 and functioning as one of elements of a mechanical system of the locking mechanism and aid the coupling and uncoupling of the female and male components and fixation of the two-part of the attachment system as an operation portion (See FIGS. 1-10).

Moreover, antirotating thorns 24 and arched or tunnel shape or inverted U shape lockers 25 of the female portion of the attachment system using as major anti-rotation elements to prevent circular loose movements of a female portion of the attachment system 22 in the internal fitting surface of removable denture and improve stability as well (See FIGS. 1-11).

As shown in FIGS. 1-11 a male portion of attachment system 11 is preferable including mating surface 16 as an elliptical cone shape or dome shape in nature to prevent distortion of dental attachment parts during initial insertion or snapping movement of full and partial removable implant-retained, or implant-supported overdentures.

As shown in FIGS. 1, 2, 4, 5, 7, 8, 10 releasing auxiliary spiral shape hydraulic pressure grooves 17 are located on the mating surface of male component 16 and are used to descries hydrolytic pressure by metering the flow of saliva fluid out of surfaces of attachment system parts.

FIGS. 1, 2, 4, 5, 7, 8, 10 illustrated that the male portion of attachment system 11 has a reverse trapezoid shape collar of the male portion 12 and downwardly proceed to the threaded core of the male portion 12 of dental implant attachment 13 with a specially limited number of threads 14.

In addition, the reverse trapezoid shape collar of the male portion 12 can be of different sizes and heights depending on gum height around the dental implants. The collar projects a level on the soft tissue of the gum. The gum may hold a teeth with roots of the teeth serving as an attachment mechanism.

The female 22 and male 11 components of the attachment system 10 for a dental implant attachment system for implant-supported and implant-retained full and partial removable overdentures have tunnel-shaped lockers 25 as a retention part which has at one end inverted U shape rod protrude toward and can be located on two, three or four outer surfaces of these components (See FIGS. 1-11).

The wider the size of the alveolar ridge of the jaw the greater the number of tunnel shape or inverted U shape lockers, or in other words the number of lockers 25 is directly proportional to the size of the alveolar ridge (See FIGS. 1-11).

To determine the appropriate position and number of tunnel shape or inverted U shape lockers 25 in the male portion of the attachment system, it's required to obtain the volume of the patient's bone. (See FIGS. 1-10).

The anchorage section includes the threaded core of dental implant attachment 13 with threads 14 having and corresponding to sufficient and specific separation of its threads and a certain number of threads to permit the male component 11 of the attachment system to reach a position where arched or tunnel shape lockers 25 as a part of the male portion 11 will be in mesial-distal position depending on the width of bone size in the case with two lockers.

By selecting the thread count or thread pitch on threaded core 13 and thread gaps within 1 inch of the screw are used to determine the appropriate position and number of tunnel shape or inverted U shape lockers 25 in the male portion (See FIGS. 1-11).

This number will help determine whether a screw will thread into a certain bolt properly to determine the size and thread count of any screw.

Figure 3:
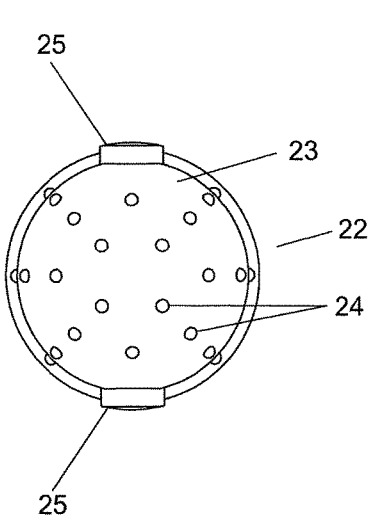
FIG. 3 is a top plan view of a preferred shape of a female component of the dental implant attachment system for fully and partial removable implant-retained, or implant-supported overdentures with two arched or tunnel shape or inverted U shape lockers, according to another embodiment of the invention, in screw-retained configuration.
Figure 4:
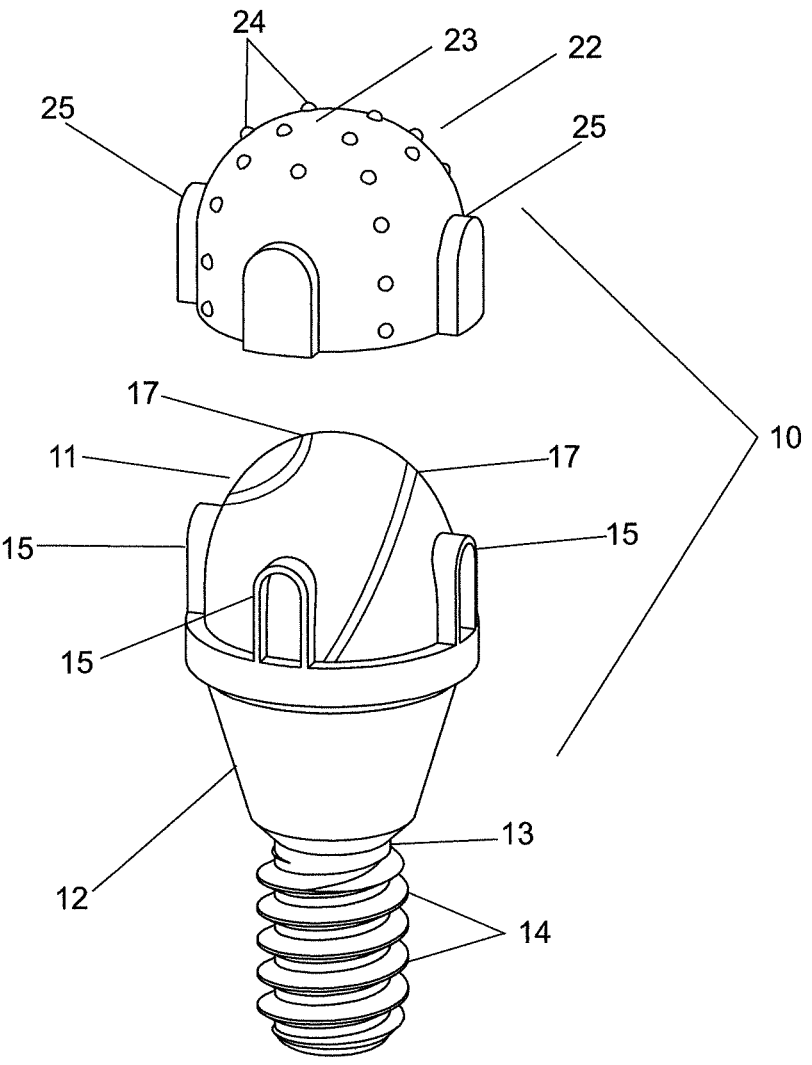
FIG. 4 is a perspective view of a preferred shape of a female and male component, partially shown, of the dental implant attachment system for fully and partial removable implant-retained, or implant-supported overdentures with three arched or tunnel shape or inverted U shape lockers, the second and third arched or tunnel shape or inverted U shape lockers, partially shown, in screw-retained configuration.
Figures 5, 6:
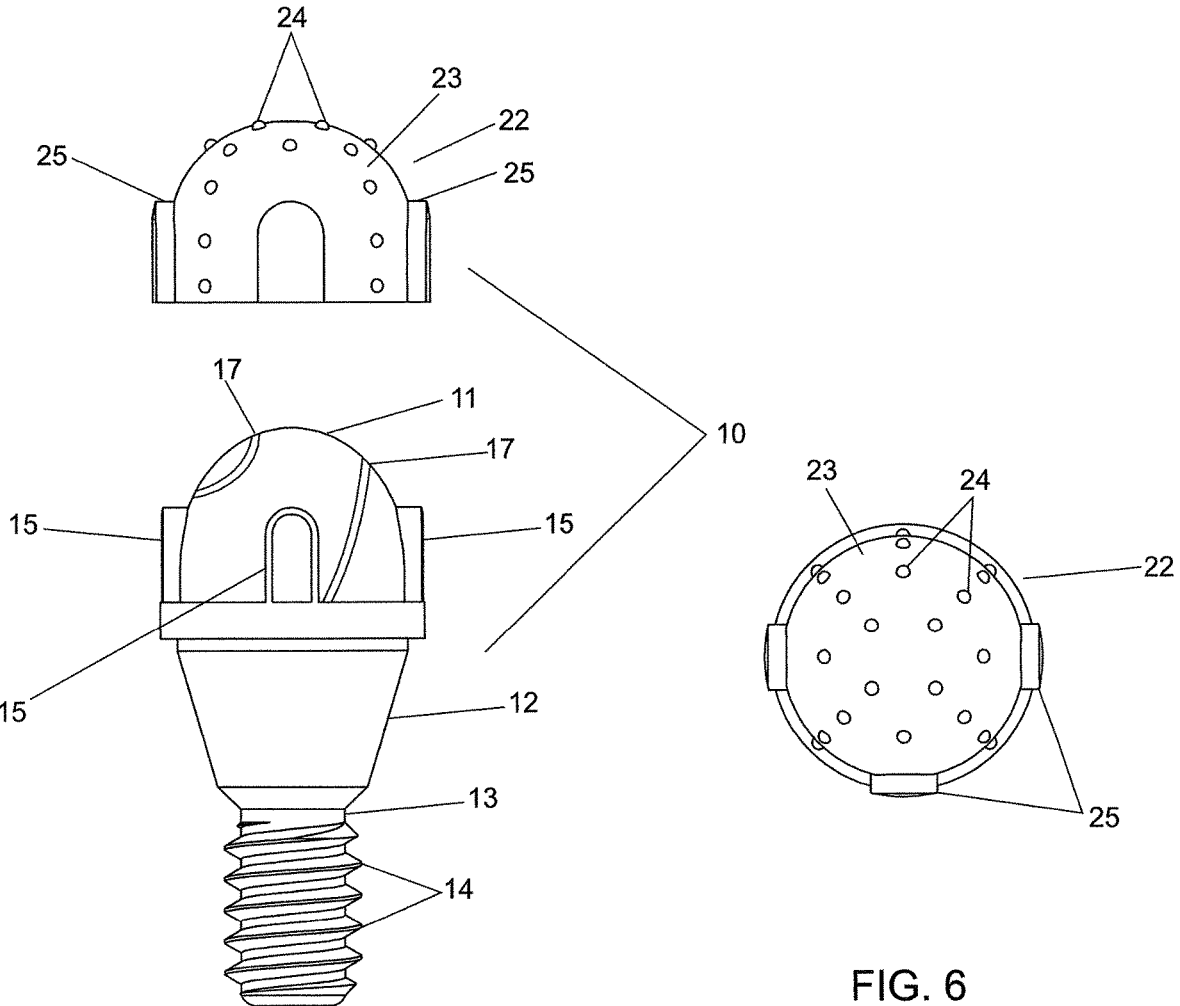
FIG. 5 is a side elevational view of a preferred shape of a female and male component shown partially of the dental implant attachment system for fully and partial removable implant-retained, or implant-supported overdentures with three arched or tunnel shape or inverted U shape lockers, according to another embodiment of the invention, the second and third arched or tunnel shape lockers shown partially, in screw-retained configuration.
FIG. 6 is a top plan view of a preferred shape of a female component of the dental implant attachment system for fully and partial removable implant-retained, or implant-supported overdentures with three arched or tunnel shape or inverted U shape lockers for dentures according to another embodiment of the invention, in screw-retained configuration.
Figure 7:
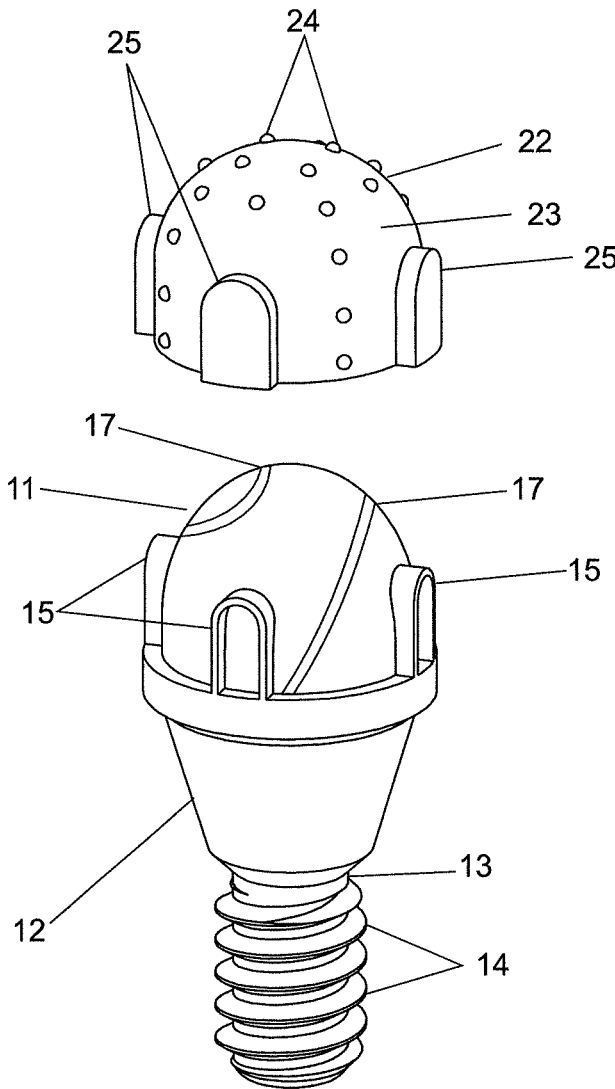
FIG. 7 is a perspective view of a preferred shape of a female and male component shown partially of the dental implant attachment system for fully and partial removable implant-retained or implant-supported overdentures with four arched or tunnel shape or inverted U shape lockers, according to another embodiment of the invention, the second and third arched or tunnel shape lockers shown partially and fourth one is not shown, in screw-retained configuration.
Figures 8, 9:
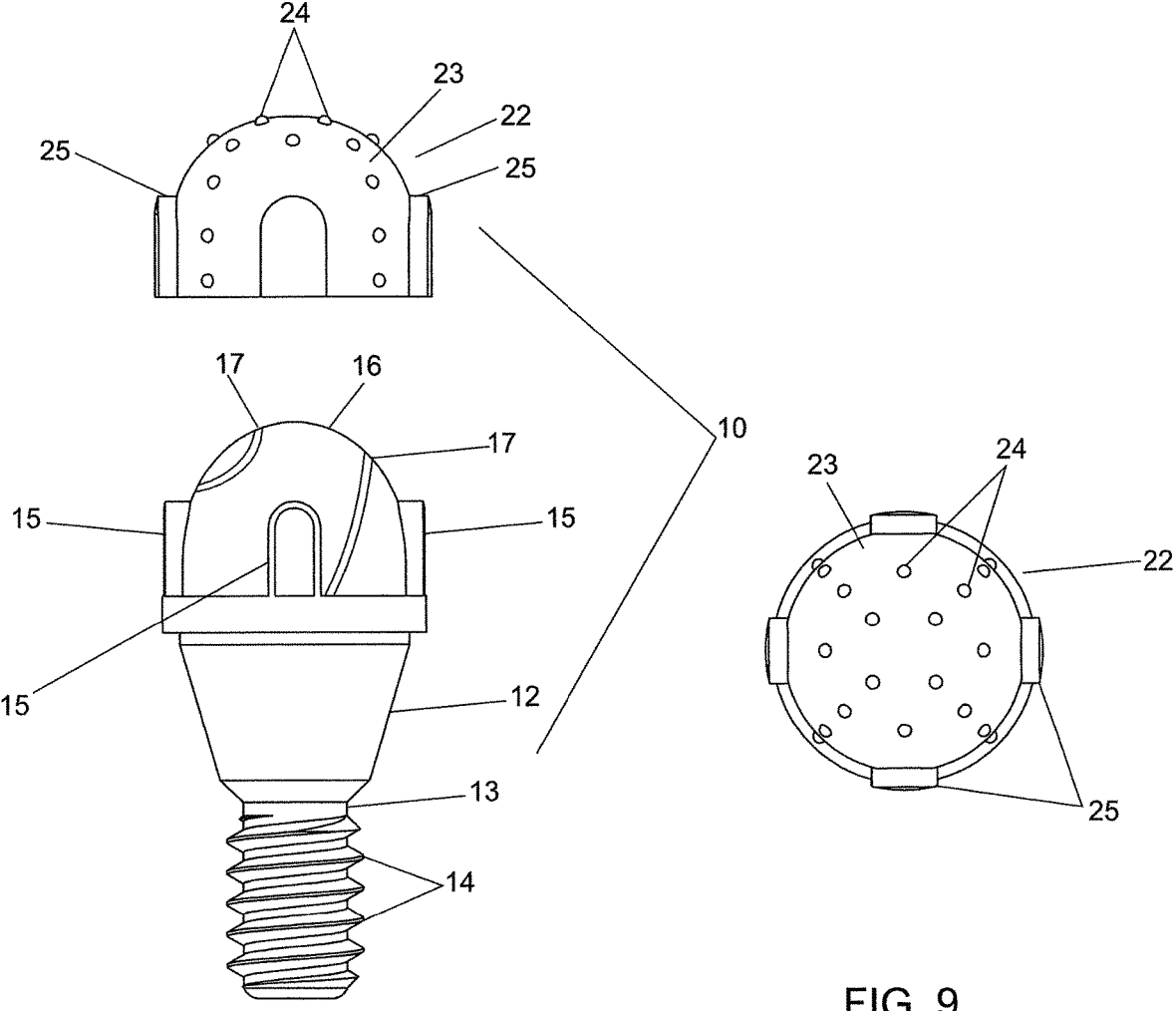
FIG. 8 is a side elevational view of a preferred shape of a female and male component shown partially of the dental implant attachment system for fully and partial removable implant-retained or implant-supported overdentures with four arched or tunnel shape or inverted U shape lockers, according to another embodiment of the invention, the second and third arched or tunnel shape lockers shown partially and fourth one is not shown, in screw-retained configuration.
FIG. 9 is a top plan view of a preferred shape of a female component of the dental implant attachment system for fully and partial removable implant-retained, or implant-supported overdentures with four arched or tunnel shape or inverted U shape lockers, according to another embodiment of the invention, in screw-retained configuration.

The specific position of the male portion of attachment system 11 depending on bone size will be with variation with two, three, or four U shape lockers (See FIGS. 3, 6, 9).

Figure 10:
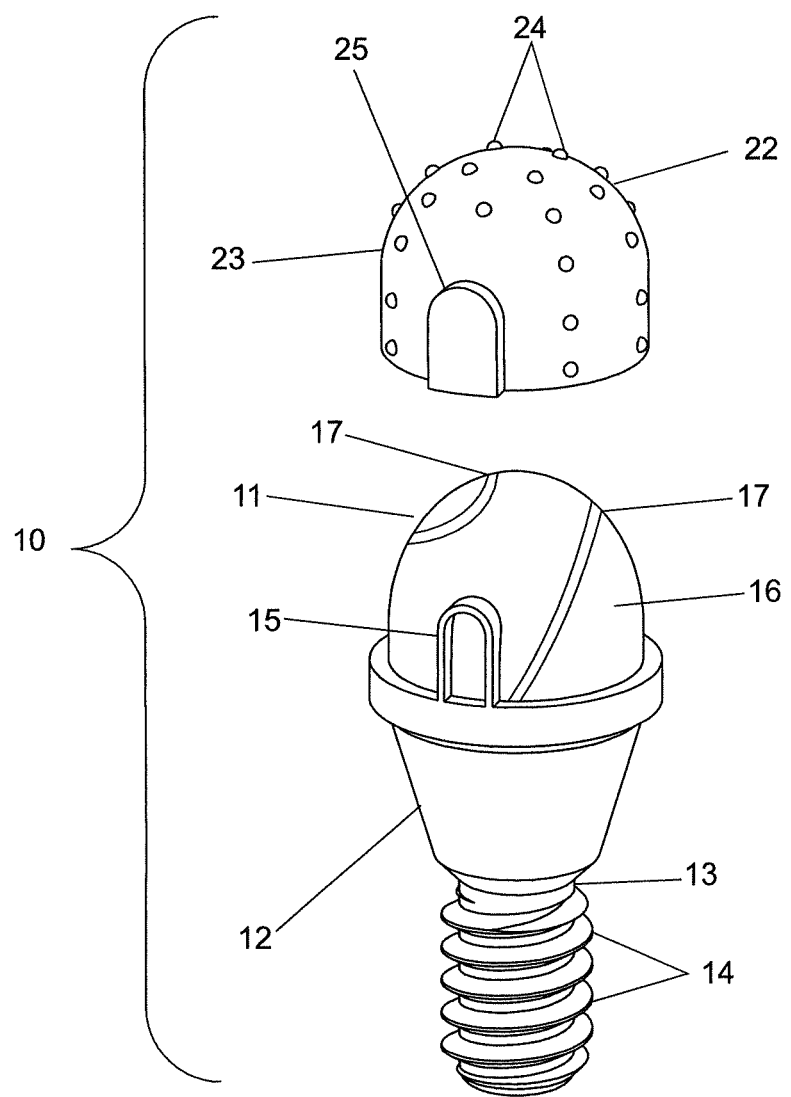
FIG. 10 is a perspective view of a preferred shape of a female component and male component, shown separated from the dental implant attachment system for fully and partial removable implant-retained, or implant-supported overdentures in screw-retained configuration.
Figure 11:
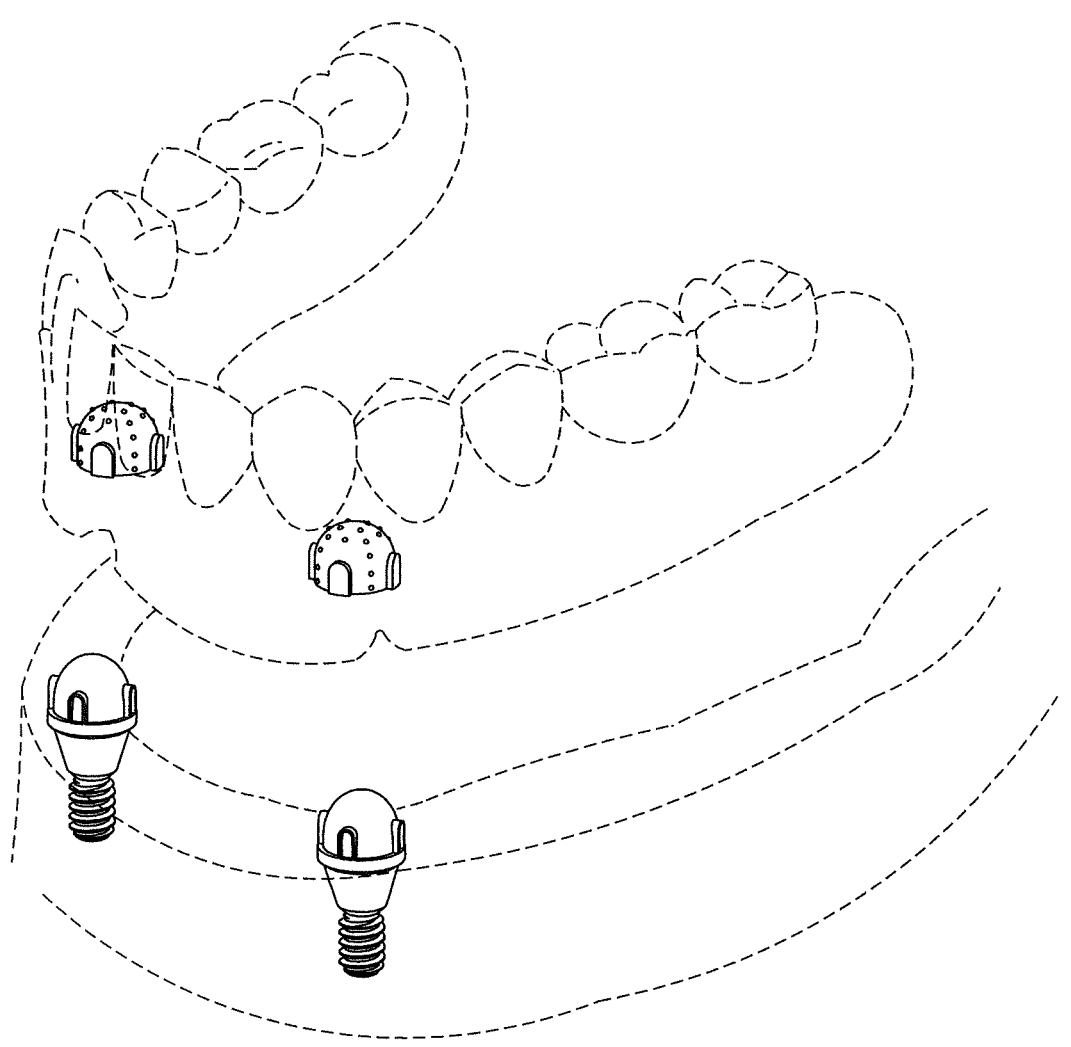
FIG. 11 is a diagrammatic view showing the method of the insertion of the dental implant attachment system for fully and partial removable implant-retained, or implant-supported overdentures.

The implant-supported and implant-retained full and partial removable overdentures can be removed frequently for cleaning maintenance by simply snapping female component 22 out of male component 11 and can then be re-engagement (See FIGS. 10-11).

The current invention could, however, be embodied in several different forms and should not be seen as limited to the embodiments set forth herein rather, these inventions are provided so that this disclosure will be complete, and will fully convey the scope of the invention to those skilled in the art.

The following explanation directs to embodiments of the present invention applicable to dental implant attachments.

Moreover, it will be welcomed that the current invention is not limited to this application but may be applied to in other medical fields such as auricular, ocular, and nasal reconstructions in plastic and reconstructive surgery, etc.

Dental Implant Attachment System Efficiency and Impact Changes in Geometry of Comparative Examples The numerous previous designs were subject to investigation and tested for dental attachment system efficiency. Analysis of a dental implant attachment system is investigated for this invention.

The analysis was performed with the intent to support the innovative ideas of how to improve the geometry of the attachment system of the dental implant could avoid its rotation around its axis on the base of the acrylic implant overdenture denture.

The following two designs have been selected: the conventional dental attachment system with a round attachment housing and the current invention with an attachment housing along with tunnel or inverted U shape lockers and antirotating thorns.

As a preliminary study, a simplified case has been analyzed to investigate the possibility of improving a traditional design of the housing attachment. Simplifications include:

Moment or External Forces (M)

Reaction Moment ($M_R$)

Reaction Forces ($F_R$)

However, this report can be viewed as a comparative study-and the result relative to each other showing strong benefits of choosing the current inventions with a dental attachment system for removable prosthesis along with a tunnel or inverted U shape lockers and antirotating thorns.

This short report intends to support the idea of how improving the geometry of the dental implant attachment system female component could avoid its rotation around its own axis on the acrylic denture.

Figure 12:
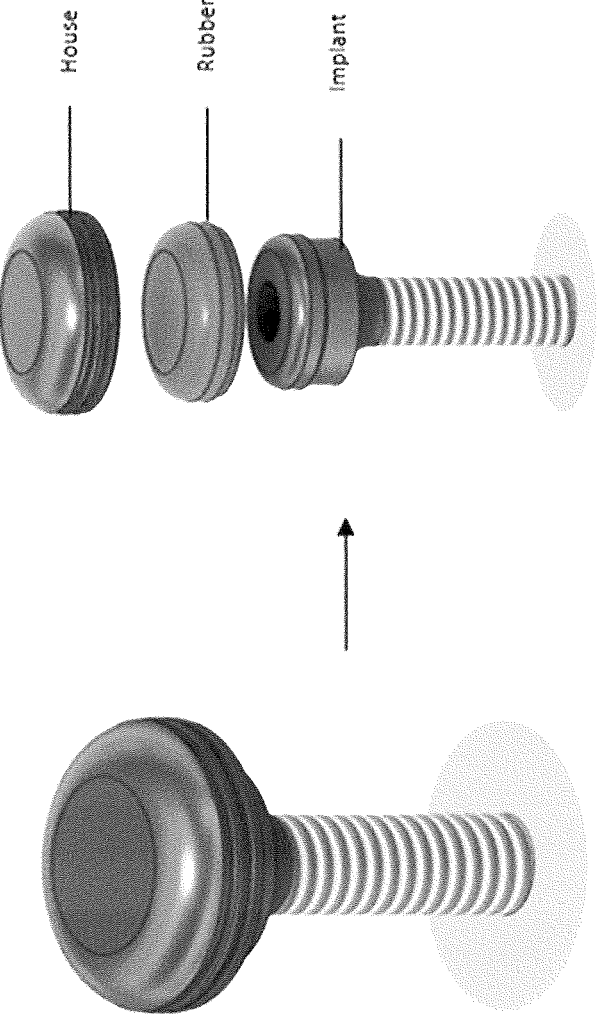
FIG. 12 is a perspective and exploded image of the prior art such as a conventional dental implant attachment system with a round house.

In this case, we are testing a conventional dental implant attachment system with a round housing to be inserted into the base of the acrylic denture. See FIG. 12.

Figures 13, 14:
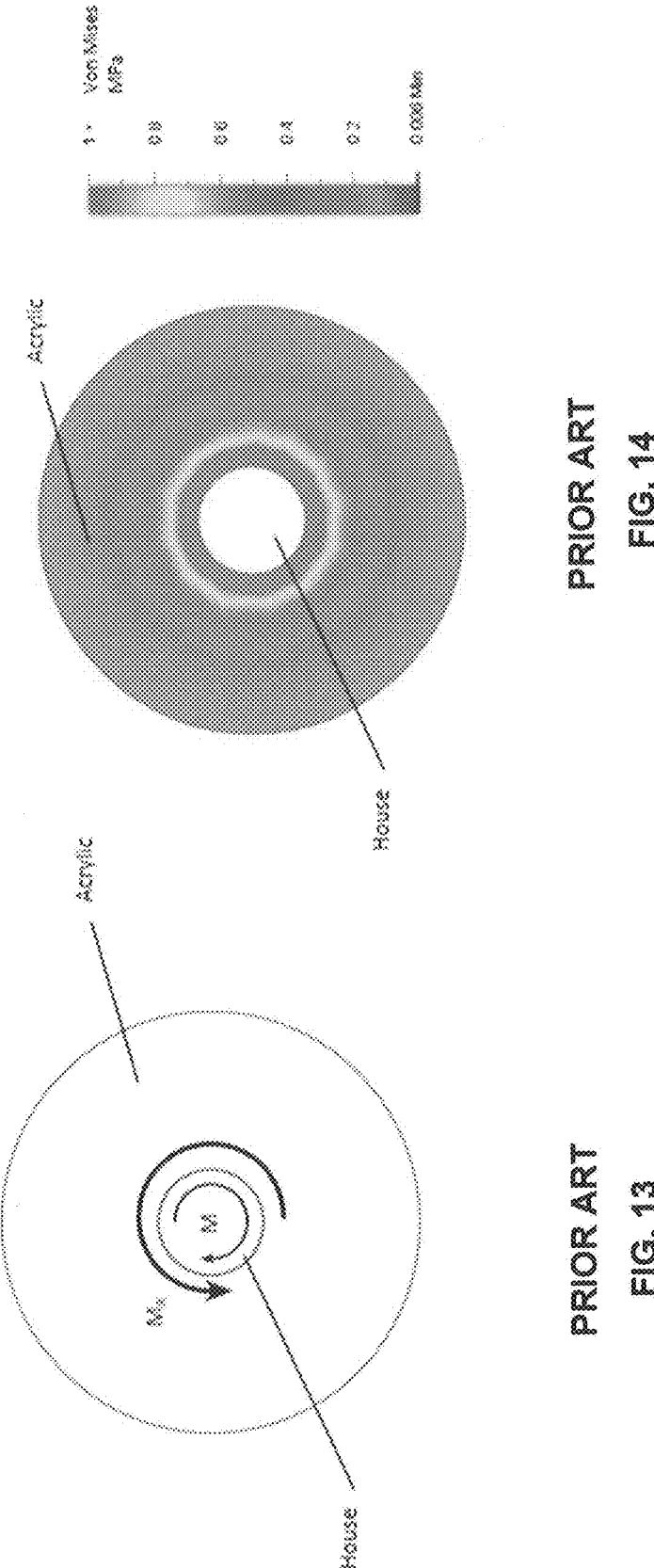
FIG. 13 is a perspective and exploded image of the moment's (M) application process to the implant attachment house, with blocking rotation of the house is the reaction moment (MR) created by the adhesive properties of the acrylic for competitor's physical model.
FIG. 14 is a perspective and exploded image of competitor's stress preview with an interface of high stress area between the acrylic of removable denture and the implant attachment system house or female component, where the adhesion properties are expected to be low, which leads to failure allowing the house to freely rotate in the acrylic.

When a moment (M) is applied to the implant attachment housing, the only thing blocking the rotation of the housing is the reaction moment ($M_R$) created by the adhesive properties of the acrylic (see FIG. 13).

After simulating this case, it is possible to confirm that the high stress area (see FIG. 14) is the interface between the acrylic of removable denture and the implant attachment system housing or female component, where the adhesion properties are expected to be low, which leads to failure allowing the housing to freely rotate in the acrylic.

Figure 15:
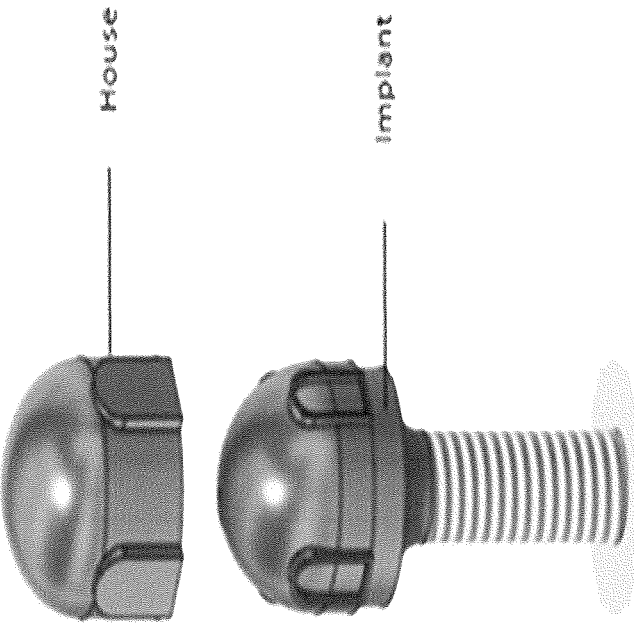
FIG. 15 is a perspective and exploded image of the proposed current invention with innovative geometry of the attachment house along with arched or tunnel shape lockers and antirotating thorns.
Figure 15:
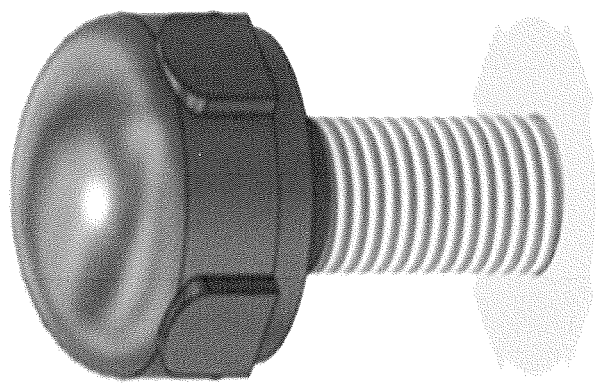

In the other case, the current inventions with the attachment housing along with arched or tunnel shape lockers and antirotating thorns avoid the rotation. Thus, it is proposed to improve the geometry of the housing in the present innovations, as seen in FIG. 15.

Figures 16, 17:
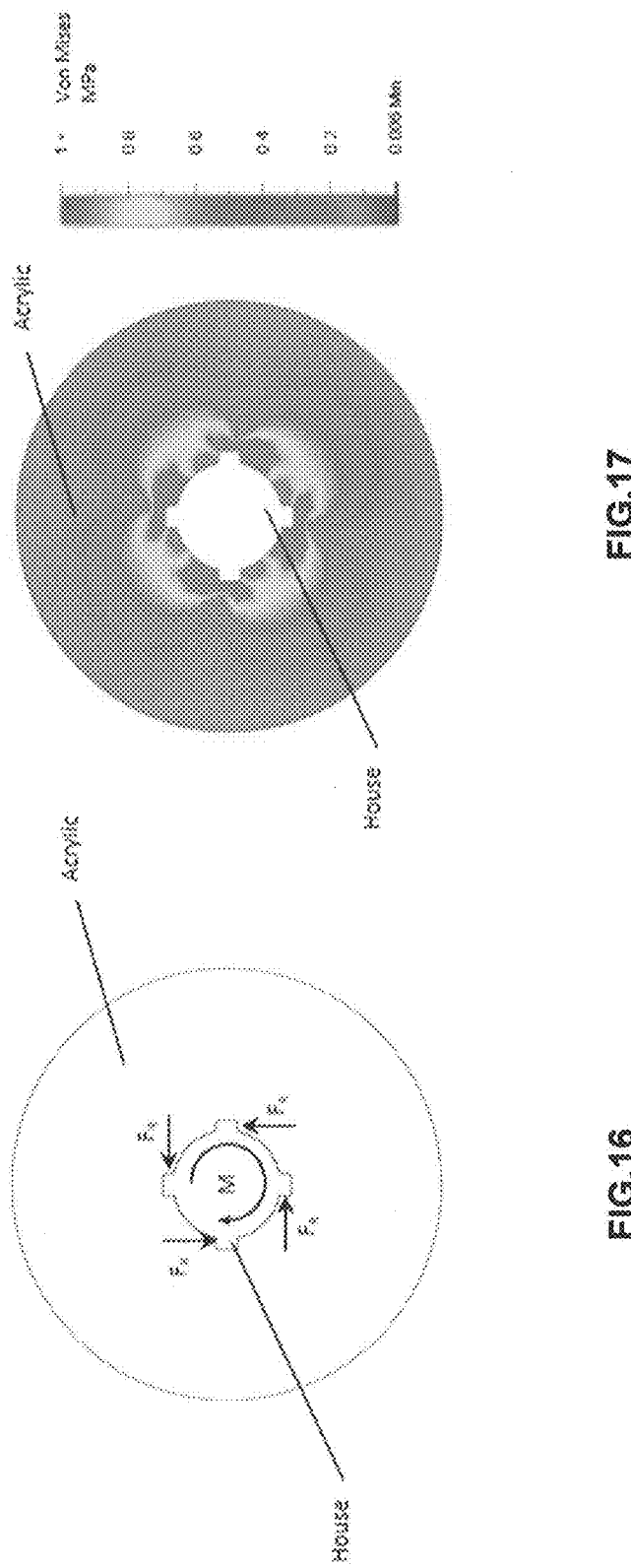
FIG. 16 is a perspective and exploded image of the proposed current invention when a moment (M) is applied to the innovative female component or house and the house will not be able to rotate around its own axis, because of the reaction force (FR) created by the improved geometry of female component of proposal physical model.
FIG. 17 is a perspective and exploded image of the proposed current invention with innovative geometry of the attachment house with possibility confirmation of the adhesive properties as nonexistent rotation blocking by the acrylic.

When a moment (M) is applied to the female component or the housing, in this case, even if we assume the adhesive properties of the acrylic are low, the housing will not be able to rotate around its own axis, because of the reaction force ($F_R$) created by the improved geometry as seen in FIG. 16.

After simulating this case, it is possible to confirm that even when setting the adhesive properties as nonexistent there is still rotation blocking by the acrylic (see FIG. 17).

In the conclusion, from experience, the bonding (in the case of conventional dental attachment with a round attachment housing) between the acrylic and the metallic housing is broken quickly after installation, allowing the housing to rotate freely in the denture.

Figure 18:
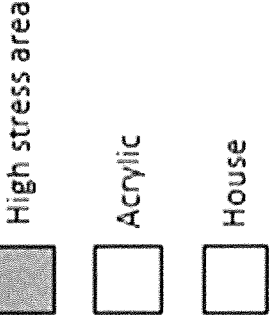
FIG. 18 is a perspective and exploded image of the proposed current invention with innovative geometry of the attachment house proposal shown prevent rotation with no adhesion between house and denture, because of the reaction force from the acrylic created by the enhanced geometry of the house.
Figure 18:
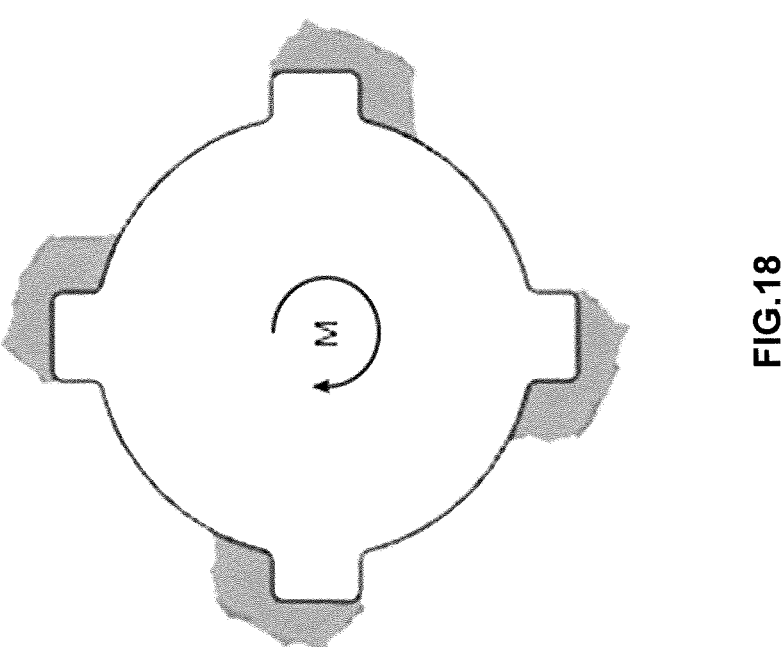

The proposal shows, that the current invention would prevent rotation even when there is no adhesion between housing and denture, because of the reaction force from the acrylic created by the enhanced geometry of the housing (see FIG. 18).

What is claimed is:

1. An apparatus comprising:
    an attachment system configured for a dental implant;
    removable overdentures;
    a male abutment component of the attachment system for connection to the dental implant, the male abutment component including:
        spiral-shaped hydraulic pressure grooves on a mating surface; and
        a collar, said collar having a height based on a level of gum soft tissue of a patient when the male abutment component of the attachment system is engaged through a twisting movement and locked into the dental implant; and
    a female attachment housing of the attachment system, the female attachment housing connected between the male abutment component and the removable overdentures, the female attachment housing embedded in the removable overdentures, the male abutment component of the attachment system locked to the female attachment housing of the attachment system with a locking mechanism, said locking mechanism incorporated in the female attachment housing.

2. The apparatus of claim 1, wherein an exterior of the male abutment component and an interior of the female attachment housing have a semi-elliptical parabolic shape.

3. The apparatus of claim 1, wherein specific geometrical shapes of mating surfaces of the female attachment housing and the male abutment component have mating and snap-on coupling engageable formation movement with non-static friction when the female attachment housing is pressed onto the male abutment component.

4. The of claim 1, wherein the male abutment component has an inverted U shape lockers located on an upper end.

5. The apparatus of claim 4, wherein the inverted U shape lockers have two U shape lockers located on outer surfaces of the male abutment component.

6. The apparatus of claim 1, wherein the male abutment component has a reverse trapezoid shape collar.

7. The apparatus of claim 1, wherein the female attachment housing has a shape-matching element embedded in the dental implant, deepening in an outer surface of the male abutment component of the dental implant in a desired position.

8. The apparatus of claim 1, wherein the female attachment housing has antirotating thorns located on an external surface.

9. The apparatus of claim 8, wherein the antirotating thorns provide stability and prevent spinning and rotating movements of the female attachment housing by increasing tightness to the dental implant.

10. The apparatus of claim 1, wherein the female attachment housing includes a tunnel shape or inverted U shape lockers as a part of the locking mechanism of the female attachment housing, located in an outer surface of the female attachment housing and functioning as one of elements of a mechanical system of the locking mechanism and aid coupling and uncoupling of the female attachment housing and the male abutment component.

11. The apparatus of claim 1 where the locking mechanism is a snap-on engagement.

12. The apparatus of claim 1 where the locking mechanism is a mating movement with friction.

13. An apparatus comprising:

an attachment system configured to attach to a root of a tooth;

removable overdentures;

a male abutment component of the attachment system configured to attach to the root of the tooth, the male abutment component including:

spiral-shaped hydraulic pressure grooves on a mating surface; and a collar that has a height based on a level of gum soft tissue of a patient when the male abutment component of the attachment system is engaged through a twisting movement and locked into the root of the tooth; and a female attachment housing of the attachment system, the female attachment housing embedded in the removable overdentures, the male abutment component of the attachment system locked to the removable overdentures through the female attachment housing with a locking mechanism, where an external surface of the female attachment housing has a dome shape.

14. The apparatus of claim 13, wherein an exterior of the male abutment component and an interior of the female attachment housing have a semi-elliptical parabolic shape.

15. The apparatus of claim 13, wherein the male abutment component has tunnel lockers located on an upper end.

16. The apparatus of claim 13, wherein the male abutment component has a reverse trapezoid shape collar.

17. The apparatus of claim 13 where the locking mechanism is a snap-on engagement.

18. The apparatus of claim 13 where the locking mechanism is a mating movement with friction.

* * * * *